United States Patent [19]

Reed et al.

[11] Patent Number: 4,822,591

[45] Date of Patent: Apr. 18, 1989

[54] TWO-REACTOR, HIGH-RECOVERY SULFUR PLANT AND PROCESS

[75] Inventors: Robert L. Reed, Houston, Tex.; John W. Palm, Tulsa, Okla.

[73] Assignee: Amoco Corporation, Chicago, Ill.

[21] Appl. No.: 648,545

[22] Filed: Sep. 7, 1984

[51] Int. Cl.⁴ ............................................. C01B 17/04
[52] U.S. Cl. ................................................. 423/574 R
[58] Field of Search ............... 423/574 R, 574 G, 576; 422/115, 171, 190

[56] References Cited

U.S. PATENT DOCUMENTS

| | | | |
|---|---|---|---|
| Re. 28,830 | 5/1976 | Hunt, Jr. et al. | 423/574 R |
| 2,767,062 | 10/1956 | Duecker | 423/576 |
| 3,873,679 | 3/1975 | Berry et al. | 423/574 G |
| 4,088,744 | 5/1978 | Reed et al. | 423/574 R |
| 4,391,790 | 7/1983 | Palm et al. | 423/576 |
| 4,462,977 | 7/1984 | Reed | 423/574 R |
| 4,482,532 | 11/1984 | Cabanaw | 423/576 |

Primary Examiner—John Doll
Assistant Examiner—Jeffrey Edwin Russel

[57] ABSTRACT

Sulfur is recovered from an acid gas stream comprising hydrogen sulfide by successively reducing the hydrogen sulfide in a thermal reaction zone, a first position Claus catalytic conversion zone operated above the sulfur deposition point, and a second position Claus catalytic conversion zone operated under conditions effective for producing and depositing elemental sulfur on the catalyst. Periodically, the reactor in the second position is switched to the first position, the reactor in the first position having previously been preconditioned thereby avoiding a temporary increase in emissions after switching.

17 Claims, 3 Drawing Sheets

TWO-REACTOR, HIGH-RECOVERY SULFUR PLANT AND PROCESS

The invention relates to gas processing. In a particular aspect, the invention relates to processing gases containing hydrogen sulfide for the recovery of elemental sulfur. In a further aspect, the invention relates to such a process utilizing the Claus reaction in a Claus process sulfur recovery plant comprising a thermal reaction zone and at least two Claus catalytic reaction zones, at least one of the two Claus catalytic reaction zones being operated under conditions effective for depositing elemental sulfur on the catalyst.

FIELD OF THE INVENTION

The conventional Claus process for sulfur recovery from hydrogen sulfide containing gas is widely practiced and accounts for a major portion of total worldwide sulfur production. Such Claus processes utilize the Claus reaction for removing hydrogen sulfide from the acid gas stream being processed:

$$H_2S + \tfrac{1}{2}SO_2 \rightleftharpoons 3/2\,S + H_2O \tag{1}$$

Typical Claus process sulfur recovery plants can include a Claus thermal reaction zone or furnace in which the hydrogen sulfide containing gas is combusted in the presence of an oxidant such as oxygen or air to form an effluent stream comprising unreacted hydrogen sulfide, sulfur dioxide, and formed elemental sulfur, as well as other compounds. This effluent stream can then be introduced into a series of one, two, or more Claus catalytic reaction zones typically operated above the temperature at which substantial deposition of sulfur on the catalyst occurs for the further production of elemental sulfur which can be continuously removed from the Claus catalytic reaction zones in the vapor phase and condensed and removed as liquid sulfur at appropriate points in the process. Recovery of sulfur from a hydrogen sulfide containing stream in a properly designed and operated plant can be as high as, for example, about 96% for a two Claus catalytic reaction zone plant or about 97% for a three Claus catalytic reaction zone plant.

In many instances, however, this level of recovery will be inadequate because of economic or environmental considerations. A number of treatment processes have therefore been developed to increase the level of overall sulfur recovery. Certain of these processes involve extensions of the Claus process under conditions which favor additional removal of hydrogen sulfide and sulfur dioxide from the gas stream being processed. Thus, the residual level of sulfur compounds can be significantly reduced by operating one or more of the Claus catalytic reaction zones under conditions such that the preponderance of formed elemental sulfur is deposited on the catalyst, thus removing elemental sulfur from the reaction mix and driving the Claus reaction (1) towards completion. Similarly, the Claus reaction in one or more Claus reactors can likewise be driven toward completion by removing water, the other primary reaction product of the Claus reaction (1), from the process stream prior to carrying out the Claus reaction in the one or more further Claus reactors.

It will be appreciated by those familiar with this art area that other processes not involving an extension of the Claus reaction are also available and have been utilized for the further removal of hydrogen sulfide and other sulfur compounds from process gas streams. These other processes include such as the SCOT (Shell Claus Offgas Treating), BSRP (Beavon Sulfur Recovery process), the Beavon-Stretford process, and the like. However, to the extent that it is economically and technically feasible, use of the Claus reaction or extension thereof is preferred for reasons of simplicity, ease of operation and maintenance, decreased capital and operating expenditure, and other similar reasons.

One area of special requirements in the sulfur recovery arts is the processing of low quality acid gases, that is, acid gases containing about 50% or less hydrogen sulfide, for example, in the range of from about 20 to about 40 mol% hydrogen sulfide. Thus, different designs of thermal reaction zones depending upon the quality of the acid gas have been developed. These include the socalled straight through process, the split flow process, and various modifications of these processes such as those in which the acid gas stream can be augmented with a fuel gas or otherwise handled to ensure adequate combustion in the thermal reaction zone.

Another area of special requirements is that of small sulfur recovery plants producing, for example, less than about five long tons per day of sulfur. Such plants can be employed to process very dilute low quality acid gas; however, the demand for and location of these plants, as well as the amount of sulfur produced is at a level which places a premium upon economical design. It will therefore be appreciated that an inexpensive and efficient plant and process for removing sulfur from dilute acid gas containing streams to low residual sulfur levels in such small plants would be highly desirable both from the perspective of economic considerations and from that of environmental concerns. Nevertheless, such plants and processes as hereinafter described have not heretofore been available.

SUMMARY OF THE INVENTION

According to the invention, there is provided a small, inexpensive, Claus process sulfur recovery plant and process using a Claus thermal reaction zone and two Claus catalytic reaction zones, at least one of which is operated under conditions effective for depositing a preponderance of the formed sulfur on the catalyst for the recovery of sulfur from an acid gas stream. A first position Claus catalytic reaction zone can be operated at a temperature above the sulfur condensation point, and a second position Claus catalytic reaction zone can be operated under conditions effective for depositing a preponderance of the formed sulfur on the catalyst to provide an overall average theoretical recovery of about 97% or greater, and as high as about 98.5%. Periodically, the first and second position Claus catalytic reactors can be interchanged. The Claus catalytic reaction zone which had been operated for sulfur adsorption in a second position can then be moved into the first position downstream of the thermal reaction zone, and thermal reaction zone effluent gas can be utilized for removing deposited sulfur from the catalyst, regenerating the catalyst, and concurrently operating the first position Claus catalytic reaction zone as a high temperature Claus reaction zone. Prior to switching the freshly regenerated first position Claus catalytic reaction zone into the second position for operation under conditions effective for depositing a preponderance of the sulfur on the catalyst, the first position Claus catalytic reaction zone can be preconditioned by introducing thereinto a cold stream having an inlet temperature effective for condensing sulfur on at least a portion of the catalyst and passing the resulting stream in contact with a remaining substantial portion of the catalyst to further prepare the first position Claus catalytic reaction zone for adsorption-type operation in the second position. In accordance with another aspect of the invention, the freshly regenerated first position Claus catalytic reaction zone can be preconditioned by passing a stream lean in sulfur and sulfur compounds in contact with at least a substantial portion of the catalyst in the freshly regenerated first position Claus catalytic reaction zone prior to switching into the second position for a period of time effective for reducing an increase in emissions where a hot, freshly regenerated reactor is switched without preconditioning into a final position in a series of Claus catalytic reaction zones. Following this preconditioning period, the two reactors can be interchanged in position, the Claus catalytic reaction zone previously operated in the second position can be heated, regenerated, and utilized for carrying on the Claus reaction at high temperatures, while the freshly regenerated and preconditioned Claus catalytic reaction zone previously operated in the first position can now be rotated into the second position where it is further cooled to adsorption temperatures and operated as an adsorption-type Claus catalytic reaction zone.

It has been found that by utilizing the process and the apparatus corresponding thereto in accordance with the invention that an inexpensive process design can be provided capable of recoveries on the order of 97% to about 98.5%. It will be appreciated by those skilled in this art area that such recoveries utilizing only two Claus catalytic converters and capable of operating on, for example, a dilute acid gas stream constitute a particularly advantageous result.

Thus, in accordance with the invention, there is provided a process for the recovery of sulfur wherein an acid gas feedstream comprising hydrogen sulfide is processed for the recovery of sulfur in a Claus process sulfur recovery plant comprising a thermal reaction zone and two and only two Claus catalytic reaction zones, the acid gas being passed successively through the Claus thermal reaction zone, a first position Claus catalytic reaction zone and a second position Claus catalytic reaction zone, the first position Claus catalytic reaction zone being generally maintained from above about the sulfur condensation point to about 700° F. and the second position Claus catalytic reaction zone being maintained under conditions effective for depositing a preponderance of the formed elemental sulfur on the catalyst therein. The process comprises passing the acid gas feedstream successively through the thermal reaction zone, the first position Claus catalytic reaction zone, and the second position Claus catalytic reaction zone, for the recovery of sulfur, then preconditioning the first position Claus catalytic reaction zone by passing a stream lean in sulfur and sulfur compounds in contact with at least a substantial portion of the catalyst or by introducing thereinto a cold stream having an inlet temperature effective for condensing sulfur on at least a portion of the catalyst and passing the resulting stream therethrough in contact with a remaining substantial portion of the catalyst and then switching the thus preconditioned Claus catalytic reaction zone in the first position into the second position and the Claus catalytic reaction zone in the second position into the first position and continuing the process.

Further, in accordance with the invention, there is provided apparatus for the recovery of sulfur comprising Claus thermal reaction means for combustinng an acid gas stream in the presence of an oxidant and for producing a hot effluent stream comprising at least sulfur dioxide, a first Claus catalytic reaction means in a first position connected in flow communication with the Claus thermal reaction means for receiving an effluent stream therefrom and for converting unreacted hydrogen sulfide and sulfur dioxide therein to elemental sulfur in the presence of a catalyst for facilitating the Claus reaction, a sulfur condenser in flow communication with the first position Claus catalytic reaction means for receiving an effluent stream therefrom, and for condensing and removing elemental sulfur, a second Claus catalytic reaction means in a second position in flow communication with the sulfur condenser for receiving a cool effluent stream therefrom and for reacting unreacted hydrogen sulfide and sulfur dioxide present in such stream in the presence of a Claus catalyst for facilitating the Claus reaction and producing and depositing elemental sulfur on the catalyst, wherein the apparatus comprises two and only two Claus catalytic reaction zones for the recovery of sulfur utilizing the Claus reaction.

In accordance with further aspects of the invention, the first position Claus catalytic reaction zone after regeneration, can be preconditioned by, for example, diluting the thermal reaction zone effluent, optionally after cooling and/or condensation of sulfur, with a cooled bypass portion of the acid gas feed to the plant and using the resulting combined stream for preconditioning the first position Claus catalytic reaction zone, by cooling effluent from the thermal reaction zone in a cooler and/or condenser downstream of the Claus thermal reaction zone, and the like, as will be better understood and appreciated from the following detailed description of the invention.

BRIEF DESCRIPTION OF THE DRAWINGS

The invention will be better understood and appreciated from the following description and the drawings in which.

Figure 1:
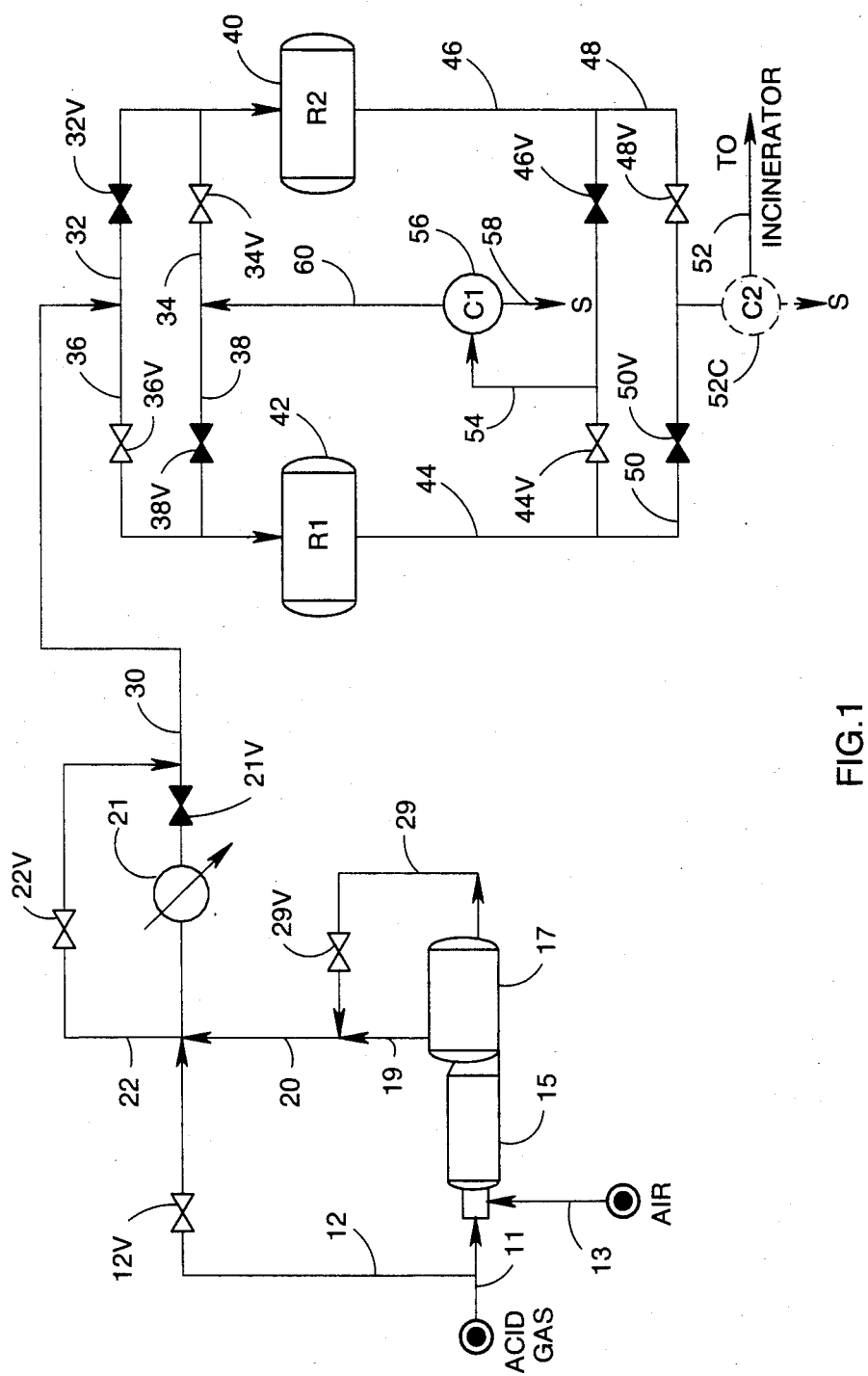
FIG. 1 represents a first embodiment of the invention.

The invention will be further understood and appreciated from the following detailed description and the Example.

DETAILED DESCRIPTION OF THE INVENTION

In accordance with the invention, an acid gas stream containing hydrogen sulfide, or a portion of the stream, can be introduced into a Claus plant thermal reaction zone in the presence of an oxidant such as, for example, air, oxygen enriched air, or oxygen, and can be combusted to produce a hot effluent stream comprising formed elemental sulfur, sulfur dioxide, unreacted hydrogen sulfide, and other compounds. According to one embodiment of the invention, an acid gas stream having a hydrogen sulfide content of about 50 mol% or greater can be introduced into the thermal reaction zone (straightthrough furnace operation). According to another embodiment of the invention, an acid gas stream having a hydrogensulfide content of below about 50 mol% can have less hydrogen sulfide introduced into the Claus plant thermal reaction zone, for example, only sufficient for producing sufficient sulfur dioxide for reaction with the nonintroduced portion of the acid gas stream to form elemental sulfur in the Claus catalytic reaction zones (split-flow furnace operation). The effluent stream(s) from the Claus plant thermal reaction zone can then be cooled to a temperature in the range of from above about the sulfur condensation point to about 700° F., preferably in the range of about 450° to about 575° F., and can be introduced into a first position Claus catalytic reaction zone in the presence of a catalyst for facilitating the Claus reaction. In the presence of such catalyst, the hydrogen sulfide and sulfur dioxide remaining in the gaseous stream can be further converted to elemental sulfur and an effluent stream containing elemental sulfur in the vapor state, as well as unreacted hydrogen sulfide and sulfur condenser where such effluent stream is cooled, for example, to about 260° F. and elemental sulfur can be removed therefrom in the liquid state.

The resulting sulfur-denuded effluent stream from the sulfur condenser can then be introduced without heating into a second Claus catalytic reaction zone at temperatures such that a predominant portion of the produced sulfur is deposited on the catalyst, and further Claus catalytic conversion occurs, further reducing the level of sulfur compounds in the effluent stream. Thus, the second position Claus catalytic reaction zone can be operated under conditions of temperature such that sulfur deposition occurs, broadly in the range of from about 160° to about 330° F., preferably in the range of from about 250° to about 330° F. Prior to the time at which the reactor in the second position, which is being operated at temperatures such that a preponderance of the formed sulfur is deposited on the catalyst, reaches a predetermined sulfur loading, preferably a sulfur loading less than that at which a significant reduction in instantaneous sulfur recovery occurs, the reactor in the second position can be moved to the first position, and the reactor in the first position having in the interim been regenerated and preconditioned as appropriate, can be moved to the second position.

As indicated, prior to moving the Claus catalytic reaction zone in the first position to the second position, it is required in accordance with the invention that the Claus catalytic reaction zone be preconditioned. This preconditioning can be effected by a number of ways as described in the instant specification, and in other ways which will be apparent to those skilled in this art from the description of the invention herein.

Prior to our invention, it would have been expected that a cold stream fed to a reactor following regeneration should be one that had been processed in one or more upstream Claus reactors and consequently having a relatively reduced content of hydrogen sulfide and sulfur dioxide. We have now discovered that a gas having higher concentrations of hydrogen sulfide and sulfur dioxide may also be used, for example, a typical first position Claus reactor feed gas such as the stream in line 30 of FIG. 1 can be used. Further, we have discovered that a preconditioning step can be effective in a relative short period of time for eliminating or substantially reducing a temporary increase in sulfur recovery emissions which has otherwise been observed. While it is not completely clear why the relatively short period of preconditioning in accordance with the invention should be effective for eliminating this temporary increase in sulfur recovery emissions following switching, and without intending in any way to limit our invention by the theory hereinafter discussed, we hypothesize that the following concept explains why this type of gas stream may be used as a preconditioning gas stream in accordance with the invention described herein.

Thus, it is considered that at the end of the regeneration period, most of the catalyst of the freshly regenerated Claus catalytic rection zone in the first position will have the same temperature as the effluent gas from the reactor, the effluent gas having a relatively high sulfur vapor content such as is typical of a first position Claus reactor effluent gas. At the same time, at the end of the regeneration period the sulfur loading of the catalyst has been greatly reduced but can still be high enough to cause the observed unacceptable temporary rise in the level of sulfur emissions if the hot freshly regenerated reactor is switched immediately from the first position to the second (final) position during the gas processing flow sequence. In accordance with one aspect of the invention, the freshly regenerated first position reactor can be preconditioned by introducing thereinto a cold gas having an inlet temperature effective for condensing sulfur on at least a portion of the catalyst and passing the resulting sulfur lean stream in contact with a remaining substantial portion of the catalyst further reducing the residual sulfur loading of the remaining portion of the catalyst. During this preconditioning phase, the entering cold gas stream can create a low temperature catalyst zone at the inlet side of the catalyst bed which can promote the Claus reaction and sulfur adsorption at temperatures effective for condensing sulfur on the catalyst and can produce a lean gas of low sulfur content leaving the low temperature catalyst zone that can flow through the remaining substantial portion of higher temperature catalyst and reduce its residual sulfur content to a significantly lower value. Thus, it is considered that by using a cold gas having an inlet temperature effective for condensing sulfur on at least a portion of the catalyst, a layer of the catalyst at the upstream end of the bed in the freshly regenerated catalyst is cooled to the sulfur condensation point, the freshly regenerated catalyst then promotes the Claus reaction in this cooled portion of the bed, most of the thus formed sulfur vapor being removed by adsorption of sulfur from the gas onto the freshly regenerated and cooled catalyst. As the resulting gas which is relatively lean in sulfur and sulfur compounds compared with the regeneration gas stream then flows through at least a remaining substantial portion of the hot regenerated catalyst, the relatively lean gas is heated by the hot regenerated catalyst, and strips additional sulfur from the already regenerated catalyst, reducing its residual sulfur loading to a significantly lower value. Although the additional amount of sulfur stripped from the catalyst during this cooling phase can be small by comparison with the total amount of sulfur adsorbed on the catalyst and removed by regeneration, we have discovered that by removing it during the preconditioning phase in accordance with the invention, and then switching the reactor from the first position operation to the second (final) position, a lower sulfur emissions rate is achieved during the time period immediately after switching, and that a higher emissions rate results from switching the reactors immediately at the end of regeneration without the preconditioning step in accordance with the invention.

From the above it will be appreciated that the preconditioning step in accordance with the invention can be effected by passing a gas stream relatively low in sulfur and sulfur compounds in contact with at least a substantial portion of the hot freshly regenerated catalyst while in the first position for a period of time to further reduce the level of residual loading in at least a substantial portion of the catalyst and then switching the thus preconditioned reactor into the second position. In accordance with a specific aspect of the invention, the preconditioning can be effected by introducing a cold gas stream having a temperature effective for condensing sulfur on at least a portion of the catalyst into and passing the resulting stream through the remainder of the hot, freshly regenerated reactor. Preferably the inlet temperature of the cold gas stream can be in the range of about 160 to about 330° F., preferably in the range of about 250° to about 330° F. Cooler temperatures can, of course, also be utilized; however, temperatures in the above specified range will be adequate for creating the low temperature zone in the upstream portion of the freshly regenerated first position Claus catalytic reaction zone and can be readily available in the process itself.

We have further found that the preconditioning step need be conducted only for a relatively short period of time to achieve an advantageous result. Thus, it is expected that generally a preconditioning period on the order of a few hours, for example, less than one or two hours, will be adequate to significantly ameliorate the otherwise observed increase in sulfur emissions after switching the hot, freshly regenerated first position Claus catalytic reaction zone into the second position.

As indicated, the preconditioning step can be continued for a period effective to eliminate or significantly reduce the temporary rise in sulfur emissions which otherwise occur after switching a freshly regenerated Claus catalytic reaction zone into the final position without preconditioning in accordance with the invention. Based upon our observation, it appears that generally a relatively short period of time will be effective, for example, on the order of a few hours preferably on the order of one or two hours or less. The minimum period of time required for preconditioning in accordance with the invention will be that period of time required to effect a significant reduction in the otherwise observed temporary increase in sulfur emissions when the preconditioning step is omitted. It will be appreciated that this can vary from plant to plant. However, the minimum period of time can be readily established by a person skilled in the art by observing operation of the plant in accordance with the invention. Thus, the operator can observe emissions from the plant in accordance with the invention, for example, with a Continuous Stack Emissions Monitor (CSEM), or the like, determine the occurrence and time frame of the temporary increase resulting when the hot, freshly regenerated reactor is switched immediately into the final position of a series of Claus catalytic reaction zones, and can increase the preconditioning time until the temporary increase in sulfur emissions is significantly ameliorated, for example, reduced by a factor of 10% or more, preferably by about 50% or more, most preferably by about 80% or more. It will be appreciated that such time periods can be broadly in the range of from a few minutes to one or two hours or more. However, generally, the period of time will be relatively small as compared to the normal adsorption period for a reactor, for example, less than about 25% of the normal adsorption period. Thus, it will be apparent to persons skilled in the art that most of the cooling of the freshly regenerated catalytic reaction zone will occur after being switched into the final position.

Although it is considered that a major portion of the beneficial effect of the preconditioning step in accordance with the invention is accomplished by its stripping action as described above, it will be appreciated by those skilled in the art that during preconditioning of the first position Claus catalytic reaction zone by introducing a cold stream thereinto, a catalyst temperature reduction occurs simultaneously; and it will be further appreciated that for each approximately 40° F. change in the catalyst temperature, that the sulfur content of a gas stream passing in contact with the catalyst can be reduced by a factor of about 2. Thus, in accordance with a preferred embodiment of the invention, the preconditioning step can be conducted for a period of time effective to reduce the temperature of the Claus catalytic reaction zone to about 550° F. or lower.

DETAILED DESCRIPTION OF THE DRAWINGS

Referring now to FIG. 1 in detail, FIG. 1 represents a first embodiment of the invention in which there is provided process and apparatus for passing a first portion of the acid gas feed to the Claus thermal reaction zone and producing a hot effluent product stream comprising at least sulfur dioxide, cooling the hot effluent product stream, combining the thus cooled effluent product stream with a second portion of the acid gas feed and passing the resulting combined stream to the first position Claus catalytic reaction zone for the recovery of sulfur, the step of preconditioning the first position Claus catalytic reaction zone prior to switching being effected periodically by cooling the combined stream prior to passing the combined stream to the first position Claus catalytic reaction zone.

Thus, an acid gas stream comprising hydrogen sulfide can be introduced by line 11 into the Claus thermal reaction zone (furnace) 15 in the presence of air or other oxygen-containing gas which can be provided, for example, by line 13. The resulting hot effluent comprising at least sulfur dioxide and which may comprise, in accordance with certain aspects of the invention, hydrogen sulfide, sulfur dioxide, elemental sulfur, and other compounds can then be passed into the waste heat boiler 17, which in the illustrated embodiment is integrally combined with the furnace 15, waste heat boiler 17 being effective for cooling the hot effluent stream from the Claus thermal reaction zone by one or more passes therethrough. Effluent from the waste heat boiler 17 can be removed, for example, by line 29 having valve 29V at a temperature of about 800° to about 1500° F., preferably in the range of about 900° to about 1200° F., and also by line 19, at a temperature in the range of about 600° to about 1000° F., preferably in the range of about 700° to about 900° F., and combined with a portion of the acid gas feed in line 11 which can be bypassed around the Claus thermal reaction zone by line 12 having associated valve 12V. The combined stream can then be passed by line 22 having associated valve 22V shown open, and by line 30, to a Claus catalytic reaction zone comprising a first and a second Claus catalytic reaction zone R1 and R2.

Generally, the effluent stream in line 30 can have a temperature in the range of from above about the sulfur condensation point to about 700° F., preferably in the range of about 450°–575° F., and can be passed to a first position Claus catalytic reaction zone, reactor 42 (R1) in the illustrated configuration of FIG. 1, by line 36 having associated valve 36V. The first position Claus catalytic reaction zone can contain a bed of catalyst for facilitating the Claus reaction, the catalyst comprising, for example, alumina, activated alumina, or the like. In the presence of the catalyst, the Claus reaction is facilitated and further elemental sulfur can be produced resulting in an effluent stream comprising unreacted hydrogen sulfide and sulfur dioxide, elemental sulfur in the vapor phase, and other compounds which can be removed by line 44, associated valve 44V and line 54 to sulfur condenser 56 in which the effluent stream can be cooled to below the sulfur condensation point, liquid sulfur being removed by line 58.

The resulting sulfur denuded effluent stream from sulfur condenser 56 at a temperature, for example, of about 260° F., can then be removed by line 60, line 34, valve 34V, to a second position Claus catalytic reaction zone, in the illustrated configuration to reactor 40 (R2), the second position Claus catalytic reaction zone being operated under conditions effective for depositing a preponderance of the formed elemental sulfur on the catalyst in the reactor. Typically, as indicated above, these conditions will include operating at temperatures below about 330° F., broadly in the range of from 160° F. to about 330° F., preferably in the range of from about 250° F. to about 330° F., and most preferably having an inlet temperature of about 260° F.

The effluent stream from reactor 40 can be removed by line 46, line 48, valve 48V, and line 52, having optional sulfur condenser 52C, for example, to an incinerator or to further tail gas treating (not shown). The Claus reaction is permitted to continue as the sulfur loading on the catalyst in the second position Claus catalytic reaction zone increases, but not until the sulfur loading reaches a level at which the instantaneous recovery of sulfur starts to decline. Prior to such time, the reactor R1 in the first position can be preconditioned in accordance with one aspect of the invention by introducing thereinto a cold stream having a temperature effective for condensing sulfur on at least a portion of the catalyst and passing the resulting stream therethrough in contact with a remaining substantial portion of the catalyst before being moved into the second position by closing valve 22V and opening valve 21V and passing the hot combined stream through cooler 21 for cooling, and then into the first position Claus catalytic reaction zone. After preconditioning, the preferably already at least partially cooled first position Claus catalytic reaction zone can then be switched into the second position where final cooling and adsorption take place concurrently and the Claus catalytic reaction zone previously in the second position and containing sulfur-laden catalyst can be switched into the first position by closing valves 36V, 44V, 34V, and 48V, and by opening valves 32V in line 32, 46V in line 46, 38V in line 38, and 50V in line 50. During regeneration, valve 22V can be opened and valve 21V can be closed; and during preconditioning in accordance with the invention, valve 22V can be closed and valve 21V can be opened as will be appreciated from the description herein. In this configuration, reactor 40 (R2) which previously was in the second position, is now placed in the first position where, during regeneration, the deposited elemental sulfur can be removed by the hot combined effluent stream from the thermal reaction zone.

During the period after switching, the reactor which was previously operated in the second position and having sulfur-laden catalyst therein is regenerated by passing the hot combined effluent gas stream from the Claus thermal reaction zone and waste heat boiler therethrough. Those skilled in this art area will recognize that regeneration can occur in three phases, the three phases comprising an initial heat-up phase, a plateau phase, and a final heat-up phase. In the first phase, the hot thermal reaction zone effluent stream heats the sulfur-laden catalyst to a temperature effective for vaporizing formed elemental sulfur from the catalyst. During the plateau phase, sulfur is being removed from the catalyst by vaporization and substantially all of the heat available in the hot regeneration gas is used to vaporize sulfur with little or no heat being available to heat the catalyst to a higher temperature. After a substantial portion of the sulfur has been removed from the catalyst, the temperature can further rise as vaporization of sulfur continues at a reduced rate. Concurrently with the removal of sulfur from the sulfur-laden catalyst, the catalyst is regenerated, and facilitates the forward Claus reaction at temperatures above the sulfur condensation point, the first position Claus catalytic reaction zone thus operating during regeneration as a Claus catalytic converter operating above the sulfur condensation point. During the final period of operation in the first position, the Claus catalytic reaction zone can be preconditioned, as described above, by cooling the thermal reaction zone effluent stream in cooler 21, and the reaction zone in the first position can be prepared for being moved into the second position. As discussed above, we have discovered that final regeneration of the catalyst occurs during this preconditioning period, hypothetically by the mechanism of a stripping action of a preferably indigenously produced sulfur-lean stream pushing over the catalyst.

Figure 2:
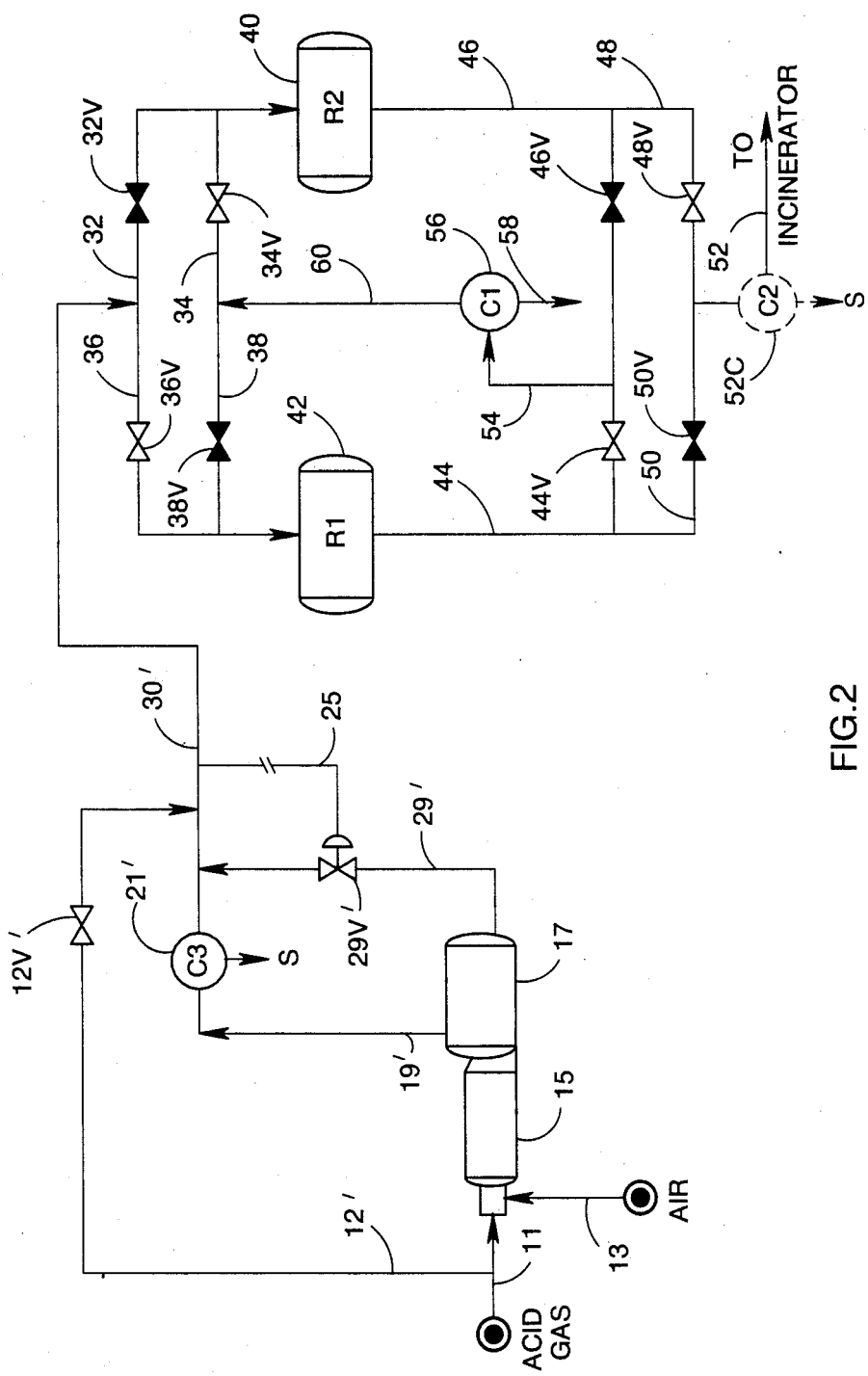
FIG. 2 represents a second embodiment of the invention.

Referring now to FIG. 2 in detail, FIG. 2 represents schematically a second embodiment of the invention, in which the process comprises passing a first portion of the acid gas feed to the Claus thermal reaction zone and producing a hot effluent product stream comprising at least sulfur dioxide, cooling a first portion of the hot effluent product stream, condensing and removing sulfur from the thus cooled first portion, cooling a second portion of the hot effluent product stream, combining the thus cooled sulfur denuded first portion of the hot effluent product stream with a second portion of the acid gas feedstream and producing a combined stream, and either heating the resulting sulfurdenuded combined stream and passing same to the first position Claus catalytic reaction zone, or periodically reducing the heating of the resulting sulfur-denuded combined stream and providing the step of preconditioning in accordance with the invention by introducing the resulting cold, sulfur-denuded combined stream at a reduced temperature into the first position Claus catalytic reaction zone and passing the resulting stream therethrough lowering the residual sulfur content of at least a substantial portion of the catalyst. According to this aspect of the invention, the apparatus according to the invention comprises a Claus furnace having an acid gas inlet, an air inlet, and an effluent products outlet, a waste heat boiler having an inlet connected in flow communication with the effluent products outlet of the Claus furnace and at least one outlet, first conduit means connecting a source of acid gas with the Claus furnace acid gas inlet; second conduit means connected in flow communication with said at least one outlet of the waste heat boiler for receiving a cooled portion of the effluent therefrom; third conduit means for bypassing a portion of the acid gas stream around the Claus furnace and for combining the thus bypassed portion with the cooled portion of effluent removed by the second conduit means.

Thus, as shown in FIG. 2, an acid gas feedstream comprising hydrogen sulfide can be introduced by line 11 and an oxygen-containing gas, for example air, can be introduced by line 13 into the Claus furnace 15 and the hot effluent stream produced therein can be introduced into waste heat boiler 17. A portion of the hot effluent stream from the thermal reaction zone can be removed from waste heat boiler 17 after, for example, one pass therethrough by line 29' having associated valve 29V', and can be utilized for reheating the process stream for condenser 21' to an appropriate temperature for high temperature Claus conversion. A second portion of the cooled thermal reaction zone effluent stream after, for example, two passes through the waste heat boiler 17 can be removed by line 19' and can be introduced into sulfur condenser 21' which can be operated under conditions effective to condense and remove elemental sulfur. The resulting cooled stream from the condenser 21' can then be reheated by being combined with first pass effluent in line 29' having temperature controlled valve 29V' therein which as illustrated can be controlled by a temperature dependent signal via line 25 from line 30' producing a heated, sulfur-denuded stream in line 30' which can be combined with a bypassed portion of the acid gas stream 11 in line 12' having associated valve 12V' and the resulting combined stream can be introduced into the Claus catalytic conversion zone comprising reactors R1 and R2 as described above in reference to FIG. 1. The other reference numerals in FIG. 2 correspond to those described above with regard to FIG. 1 and further explanation here is not required.

In accordance with this embodiment of the invention, the preconditioning step can be accomplished by passing condenser effluent substantially without reheating via line 30' directly to the first position Claus catalytic reaction zone.

Figure 3:
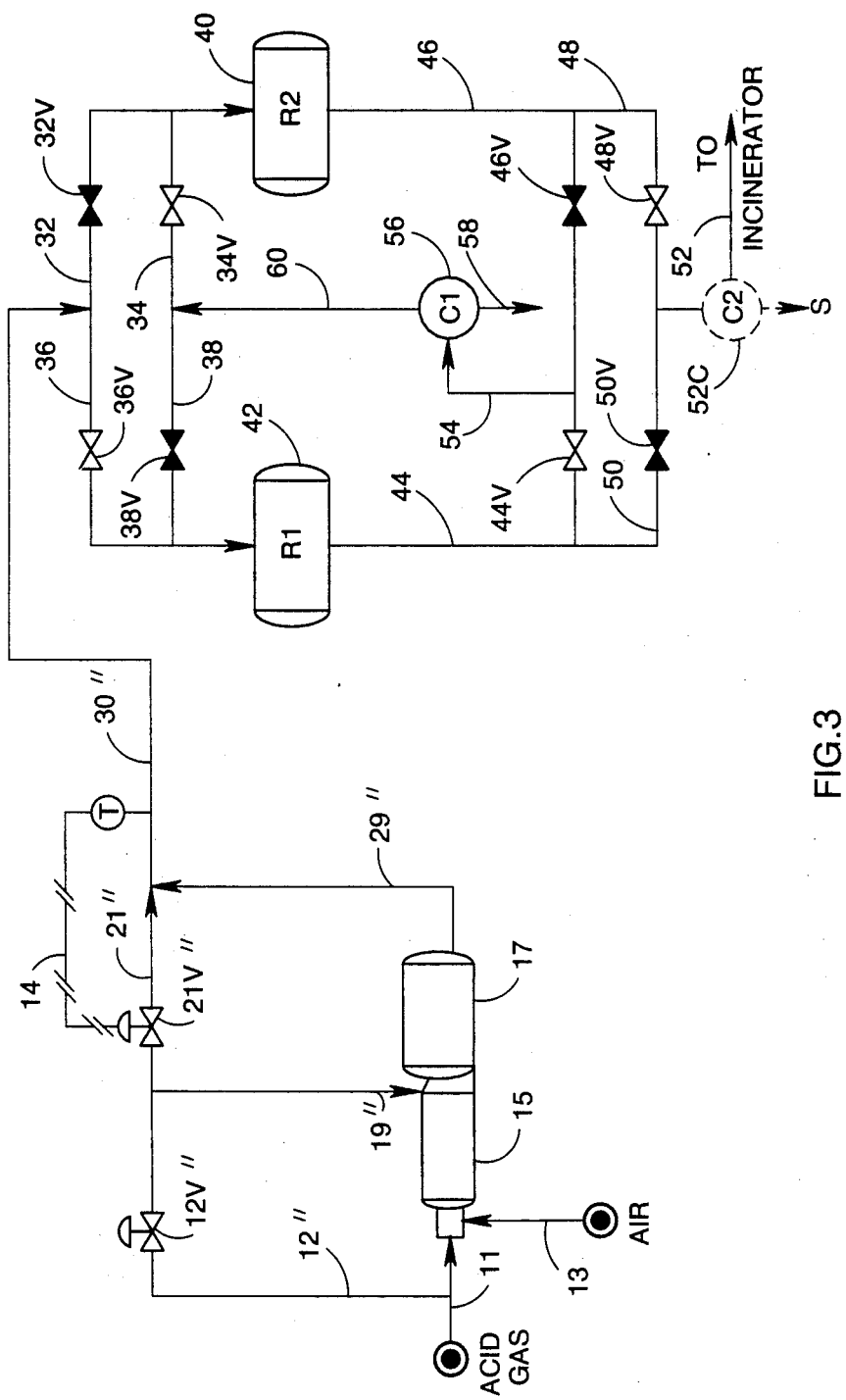
FIG. 3 represents a third embodiment of the invention.

Referring now to FIG. 3, FIG. 3 illustrates a third embodiment of the invention in which the process comprises passing a first portion of the acid gas feedstream to a Claus plant thermal reaction zone and producing a hot effluent product stream comprising at least sulfur dioxide, bypassing a second portion of the acid gas feedstream at a reduced temperature, and combining a first part of the second portion with the hot effluent product stream from the Claus thermal reaction zone while combining a second part with the effluent from a waste heat boiler, wherein the step of preconditioning comprises reducing the amount of gas in the first part of the bypassed acid gas stream introduced to the thermal reaction zone outlet and increasing the part of the bypassed acid gas stream combined with the waste heat boiler effluent stream to achieve a final combined stream temperature in the range effective for preconditioning the first position Claus catalytic reaction zone in accordance with the invention herein described.

According to this embodiment of the invention, the apparatus comprises a Claus thermal reaction zone having an acid gas inlet, an air inlet, a bypass acid gas feedstream inlet, and an effluent products outlet, first conduit means connecting a source of acid gas to the acid gas inlet of the Claus thermal reaction zone, second conduit means connected in flow communication with an outlet of the Claus thermal reaction zone for receiving a hot effluent product stream therefrom, third conduit means for bypassing a first portion of the acid gas feedstream around the Claus thermal reaction zone into the acid gas bypass feedstream inlet for combining the thus bypassed first portion of the acid gas feedstream with the portion of the hot effluent product stream removed by the second conduit means, cooling means in flow communication with the third conduit means for receiving a stream therefrom, fourth conduit means for receiving effluent product stream from said cooling means, and fifth conduit means for bypassing a second portion of the acid gas feedstream around the Claus thermal reaction zone and for combining the thus bypassed section portion of the acid gas feedstream with cooling means effluent in the fourth conduit means.

Thus, an acid gas stream in line 11 can be introduced with air by line 13 into a furnace 15, another portion of acid gas in lines 12" and 19" can be introduced into the effluent stream from furnace 15 as it enters waste heat boiler 17, and, for example, first pass effluent can be removed by line 29" and combined with a bypassed portion of the acid gas feedstream in lines 12" and 21" having associated valves 12V" and 21V", valve 21V" being controlled by a temperature dependent signal from line 30" via line 14, respectively, to produce a combined stream in line 30" which can be introduced into the Claus catalytic conversion zone for further processing as described above in reference to FIGS. 1 and 2. The other reference numerals have been described above in reference to FIG. 1 and their description need not be repeated here.

In accordance with this embodiment of the invention, preconditioning of the Claus catalytic reaction zone in the first position can be effected by controlling the proportion of acid gas at a low temperature, for example, in the range of about 90° to 150° F., from line 12" and valve 12V" which is further bypassed by line 21" and 21V" for combination with waste heat boiler effluent removed by line 29" rather than being introduced into the furnace outlet by line 19", the combined stream in line 30" otherwise being maintained at a temperature effective for high temperature Claus conversion as herein above described. Other methods of temperature control can also be used which will be apparent to those skilled in the art from the instant description, including, such as, for example, varying the steam pressure in the waste heat boiler for temperature control and the like.

The invention will be further understood and appreciated from the following example.

EXAMPLE

To simulate the flow sheet configuration in accordance with the invention, three tubular reactors were set up in series in the laboratory with the first two tubular reactors simulating two reactors R1 And R2 in accordance with the invention and the third tubular reactor simulating a catalytic incinerator. By this system, it was considered that the dynamic behavior of the system in accordance with the invention could be accurately predicted. The sulfur species from the effluent of the final adsorption-type reactor (R2) could be converted into $SO_2$ in the tubular reactor simulating a catalytic incinerator so that a sulfur material balance around the incinerator could be made to estimate the sulfur vapor loss from the system. By taking sulfur vapor loss into account, an accurate measurement of overall sulfur recovery could be obtained. For the two reactor configuration in accordance with the invention, with a 20% $H_2S$ acid gas feed, it was determined that the overall sulfur recoveries varied from as low as 93.84% right after bed switching to as high as 98.89% with an average of 97.32% as compared to a theoretical recovery of about 98.36%. The decline in sulfur recovery following each bed switch when the bed switch was not preceded by the preconditioning step in accordance with the invention had not been predicted by computer simulation and caused a significant reduction in overall sulfur recovery efficiency. Accordingly, an improved two reactor configuration in accordance with the invention was prepared for testing, the new configuration differing from the first configuration in that a condenser was added to provide a preconditioning gas stream to the first Claus catalytic conversion zone prior to switching. In accordance with the revised flow sheet, the process gas would flow to first reactor R1 then to second reactor R2 in one mode (Mode A); then in another mode (Mode B), the process gas would flow to R2 first, then to R1. In Mode A, hot gas would enter R1 at about 600° F. so that R1 would serve as a Claus reactor and the catalyst would simultaneously be regenerated, the effluent from R1 going to a condenser and then to a reactor R2 undergoing adsorption. At the end of Mode A, before beds were switched, hot gas effluent would enter a condenser where liquid sulfur would be condensed and the process gas would be cooled before entering the freshly regenerated reactor R1. R1 would then be preconditioned by this resulting gas lean in sulfur and sulfur compounds while R2 was still undergoing adsorption-type operation. After one hour, the valves were switched and the condenser was bypassed, so that the reactor previously in the second position was moved into the first position, functioned as the first Claus reaction zone, and become regenerated, while the freshly regenerated and preconditioned reactor would function as the adsorption-type reactor. It was found that the decline in sulfur recovery after switching was significantly ameliorated during 32 hours of run time. Further, an average of 98.4% overall recovery was obtained as compared to about 98.46% predicted by computer simulation. This represented a significant improvement as compared with the average of 97.32% achieved when preconditioning in accordance with the invention was not utilized.

From the above, it will be appreciated that there has been provided a small relatively inexpensive two catalytic reaction zone apparatus and process for recovering sulfur from an acid gas, the invented apparatus and process being capable of achieving recoveries of greater than about 97%, and as high as about 98.5% and which can find special application in processing a dilute acid gas, for example, having less than about 50 mol % $H_2S$ therein where sulfur loading rates can be relatively low. The apparatus and process in accordance with the invention, in comparison with a three-reactor Claus plant capable of recoveries on the order of about 97%, can achieve the following advantages:

1. A reduced capital investment in that only two Claus catalytic reactors are required. Further, the furnace and waste heat boiler can be smaller since the minimum gas flow through the furnace can be used in accordance with a preferred embodiment of the invention by passing only sufficient acid gas therethrough to provide the necessary sulfur dioxide for subsequent catalytic formation of sulfur. Further, in accordance with the embodiment of FIGS. 1 and 3, a first condenser downstream of the thermal reaction zone can be eliminated and in FIG. 3 the hot gas bypass reheat valve likewise will not be necessary. Cf. FIG. 2. As illustrated in the embodiments of FIGS. 1 and 3, only one sulfur condenser, liquid sulfur drain, and seal pot will be required, and in FIGS. 1 and 2, a bypass reheat gas valve will be required. By comparison, a conventional three-reactor Claus plant would require three Claus catalytic converters, a bypass reheat valve, two reheat exchangers, three or four condensers, and four or five seal pots and sulfur lines.

2. Reduced pressure drop. The total pressure drop through the plant in accordance with the design of FIG. 3 can be about 2.5 psi and for the embodiments of FIG. 1 and FIG. 2 can be about 4.5 psi, whereas a drop of 6 to 8 psi is normal for a three catalytic reaction zone Claus plant. Thus, the required horsepower and energy required for the air blower which will ordinarily be present, for example, on line 13, can be reduced by as much as 25% or more.

3. Improved recovery. The two-reactor CBA is capable of higher recoveries than a conventional three catalytic converter Claus from low quality acid gases. It is expected that the proposed process can show a significant improvement in recovery over the conventional three reactor Claus plant, achieving levels of recovery as high as about 98.5% overall.

It will be further appreciated by those skilled in the art that in conjunction with the invented process and apparatus, further Claus tail gas cleanup can be utilized such as tail gas cleanup processes including SCOT, BSRP, IFP, Wellman Lord, and others which are familiar to those skilled in this art and need not be further described here.

While the invention has been described in terms of preferred embodiments as required, it will be apparent that persons skilled in this art can utilize other variations and modifications and methods of practicing this invention without departing from the spirit or scope of the invention as set forth in this specification and as defined in the claims appended hereto. Accordingly, the invention is not to be restricted to the preferred embodiments described herein but by the claims hereinafter set forth.

What is claimed is:

1. Process for the recovery of sulfur
wherein an acid gas feedstream comprising hydrogen sulfide is processed for the recovery of sulfur in a Claus process sulfur recovery plant comprising a Claus thermal reaction zone and two and only two Claus catalytic reaction zones, the acid gas being passed successively through the Claus thermal reaction zone, a first position Claus catalytic reaction zone, and a second position Claus catalytic reaction zone, the first position Claus catalytic zone being maintained in the range of from above about the sulfur condensation point to about 700° F., except for preconditioning as hereinafter set forth, and the second Claus catalytic reaction zone being maintained under conditions effective for forming and depositing a preponderance of the thus formed elemental sulfur on the catalyst therein, the process comprising:

(a) passing the acid gas feedstream successively through the thermal reaction zone, the first position Claus catalytic reaction zone, and the second position Claus catalytic reaction zone for the recovery of sulfur;

(b) preconditioning the first position Claus catalytic reaction zone by introducing thereinto a cold stream having an inlet temperature effective for condensing sulfur on at least a portion of the catalyst and passing the resulting stream through a remaining substantial portion of the catalyst, the cold stream thus used for preconditioning being produced by cooling acid gas feedstream effluent from the thermal reaction zone to the first position catalytic reaction zone to said temperature; and (c) switching the thus preconditioned Claus catalytic reaction zone in the first position into the second position and continuing cooling the thus preconditioned freshly regenerated reactor in the second position concurrently with forming and depositing sulfur on catalyst therein, and switching the Claus catalytic reaction zone in the second position into the first position and continuing the process according to (a), (b), and (c).

2. The process of claim 1 wherein:
the preconditioning step is effected by introducing into the first position Claus catalytic reaction zone the cold stream having a temperature in the range of about 160° to about 330° F.

3. The process of claim 2 wherein:
the temperature of the cold stream is in the range of about 250° to about 330° F.

4. The process of claim 1 wherein:
the preconditioning step is carried out for a period of time of less than about two hours.

5. The process of claim 1 comprising:
passing a first portion of the acid gas feedstream to the Claus thermal reaction zone and producing an effluent product stream comprising at least sulfur dioxide;
cooling the effluent product stream;
combining the thus cooled effluent product stream with a second portion of the acid gas feedstream and passing the resulting combined stream to the first position Claus catalytic reaction zone;
the step of preconditioning the first position Claus catalytic reaction zone being effected by cooling the combined stream and introducing the cooled combined stream into the first position Claus catalytic reaction zone.

6. The process of claim 1 comprising:
passing a first portion of the acid gas feedstream to the Claus thermal reaction zone and producing an effluent product stream comprising at least sulfur dioxide;
cooling a first portion of the effluent product stream;
cooling a second portion of the effluent product stream;
condensing sulfur from the thus cooled second portion of the effluent product stream in a sulfur condenser and combining the thus cooled first portion of the effluent product stream with the resulting sulfur-denuded second portion after removal from the sulfur condenser; and then
combining the thus produced combined stream with a second portion of the acid gas feedstream and passing the resulting combined stream to the first position Claus catalytic reaction zone;
the step of preconditioning the first position Claus catalytic reaction zone being effected by introducing the resulting sulfur denuded second portion of the effluent product stream after removal from the sulfur condenser at substantially effluent temperature into the first position Claus catalytic reaction zone.

7. The process of claim 1 comprising:
passing a first portion of the acid gas feedstream to the Claus thermal reaction zone and producing an effluent product stream comprising at least sulfur dioxide;
combining the thus produced effluent product stream with a second portion of the acid gas feedstream bypassed around the Claus thermal reaction zone and passing the resulting combined stream to a waste heat boiler for cooling;
combining the resulting cooled combined stream wtih a third portion of the acid gas feedstream bypassed around the Claus thermal reaction zone and passing the then resulting combined stream to the first position Claus catalytic reaction zone;
the step of preconditioning the first position Claus catalytic reaction zone being effected by increasing the proportion of acid gas feedstream bypassed around the Claus thermal reaction zone in the third portion of the acid gas feed, resulting in a reduced temperature in the combined stream.

8. The process of claim 1 wherein:
the first position Claus catalytic reaction zone is operated for the recovery of sulfur at a temperature in the range of above about the sulfur condensation point to about 700° F., the first position Claus catalytic reaction zone being cooled to a temperature below about 550° F. before switching; and
the second position Claus catalytic reaction zone is operated at a temperature in the range of about 160° F. to about 330° F.

9. The process of claim 1 wherein:
the first position Claus catalytic reaction zone is operated for the recovery of sulfur at a temperature in the range of about 450° F. to about 575° F., at least a portion of the catalyst in the first position Claus catalytic reaction zone being preconditioned by introducing a cold stream thereinto, the cold stream having an inlet temperature effective for condensing sulfur on at least a portion of the catalyst and passing the resulting sulfur lean stream through a remaining substantial portion of the catalyst, the cold stream having a temperature in the range of about 250° F. to about 330° F., before switching into the second position; and
the second position Claus catalytic reaction zone is operated at a temperature in the range of from about 250° F. to about 330° F.

10. The process of claim 1 further comprising:
conducting the effluent from the second position Claus catalytic reaction zone at the exit temperature therefrom to incinerator means.

11. The process of claim 1 wherein step (b) comprises:
preconditioning the first position Claus catalytic reaction zone by passing a stream lean in sulfur and sulfur compounds in contact with at least a substantial portion of the catalyst therein for a period of time effective for reducing an increase in emissions occurring where a hot, freshly regenerated reactor is switched without preconditioning into a final position in a series of Claus catalytic reaction zones, the stream lean in sulfur and sulfur compounds being the stream resulting from condensing sulfur from the acid gas feed stream effluent from the thermal reaction zone on the catalyst in the first position Claus catalytic reaction zone.

12. The process of claim 1 wherein:
the preconditioning is conducted for a period of less than one hour.

13. The process of claim 1 wherein:
most of the cooling of a freshly regenerated reactor occurs after switching into the second position.

14. The process of claim 1 wherein:
the entire acid gas feed stream is passed successively through the first position catalytic reaction zone, and the second position Claus catalytic reaction zone at all times.

15. The process of claim 1 wherein:
wherein the catalytic reaction zone previously in the second position in which sulfur has been deposited on the catalyst after being moved into the first position undergoes regeneration of the sulfurladen catalyst therein while concurrently functioning as a high temperature Claus catalytic reaction zone producing elemental sulfur from reaction of hydrogen sulfide and sulfur dioxide.

16. The process of claim 1 wherein:
the preconditioning period during which sulfur is deposited on catalyst in the first position Claus catalytic reaction zone is less than about 25% of an adsorption period for such reactor, the remaining portion of adsorption period for such reactor occurring in the second position after switching.

17. The process of claim 1 wherein:
during preconditioning the entering cold stream creates a low temperature catalyst zone at the inlet side of the catalyst bed in the first position catalytic reaction zone which promotes the Claus reaction and sulfur adsorption at temperatures effective for condensing sulfur on the catalyst and produces a lean gas of low sulfur content leaving the low temperature catalyst zone and flowing through the remaining substantial portion of higher temperature catalyst; and wherein
the preconditioning period during which sulfur is deposited on catalyst in the first position Claus catalytic reaction zone is less than about 25% of an adsorption period for such reactor, the remaining portion of adsorption period for such reactor occurring in the second position after switching.

* * * * *